United States Patent [19]
Baskaynak

[11] Patent Number: 5,918,504
[45] Date of Patent: Jul. 6, 1999

[54] HIGH TORQUE MOTION CONVERTING AND TRANSMITTING MECHANISM FOR AN ENGINE

[76] Inventor: Hikmet Selcuk Baskaynak, 110-31 73 Rd. Apt 5-E, Forest Hills, N.Y. 11375

[21] Appl. No.: 09/020,612

[22] Filed: Feb. 9, 1998

[51] Int. Cl.[6] ................................................ F16H 21/32
[52] U.S. Cl. ................................................ 74/44; 74/51
[58] Field of Search ............................................ 74/44, 51

[56] References Cited

U.S. PATENT DOCUMENTS

| | | | |
|---|---|---|---|
| 2,314,789 | 3/1943 | Jacobsen | 74/44 X |
| 2,380,778 | 7/1945 | Murdock | |
| 2,390,558 | 12/1945 | Schoen | |
| 2,392,921 | 1/1946 | Holman | 74/44 |
| 2,407,859 | 9/1946 | Wilson | |
| 2,477,376 | 7/1949 | Jacobsen | 123/197 |
| 3,021,825 | 2/1962 | Garcia de la Para | |
| 4,211,190 | 7/1980 | Indech | |
| 4,301,776 | 11/1981 | Fleming | |
| 4,363,299 | 12/1982 | Biristol | |
| 4,395,977 | 8/1983 | Pahis | |

*Primary Examiner*—Allan D. Herrmann

[57] ABSTRACT

A motion converting and transmitting mechanism included a reciprocal motion receiver, rotatable pinned to reciprocating arm. Rotatable pinned by a first pin to a first crank arm, and rotatable pinned by a second pin to a second crank arm. The first pin is spaced from the second pin. The first crank arm rotates about a first crank axis. The second crank arm rotates about a second crank axis. First crank axis is spaced from the second crank axis. At least one crank rotates on a journal for transmitting rotary motion to a power take-off point. Mechanism is driven by the reciprocating arm and motion is converted from reciprocating to rotary. Mechanism is driven by one of the crank axis and motion is converted by rotary to reciprocating.

5 Claims, 11 Drawing Sheets

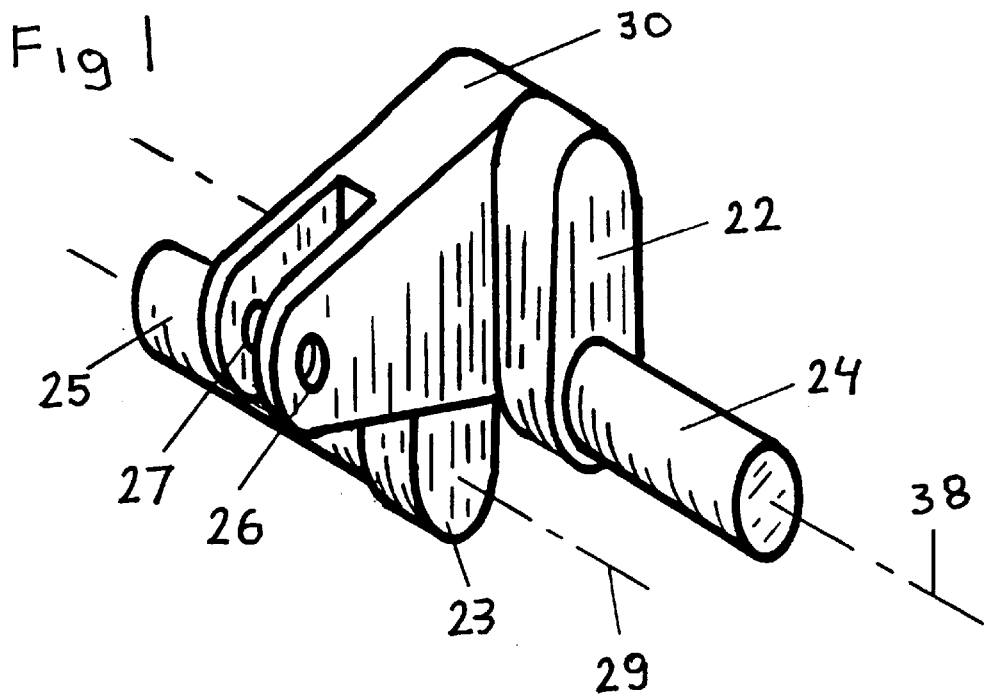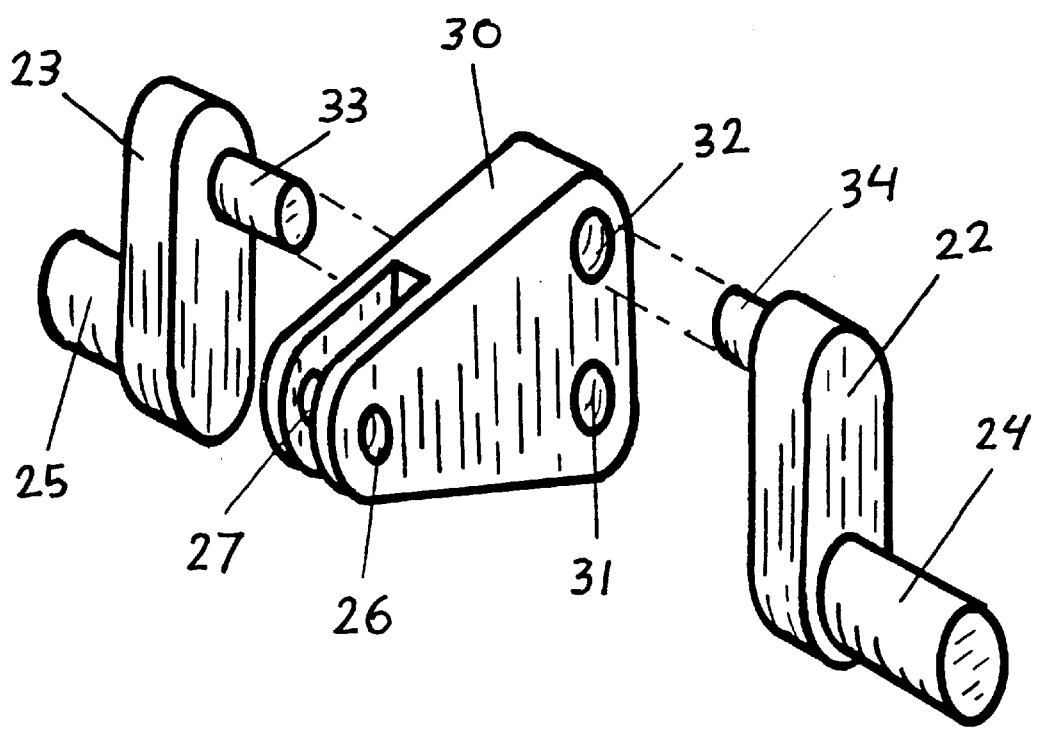

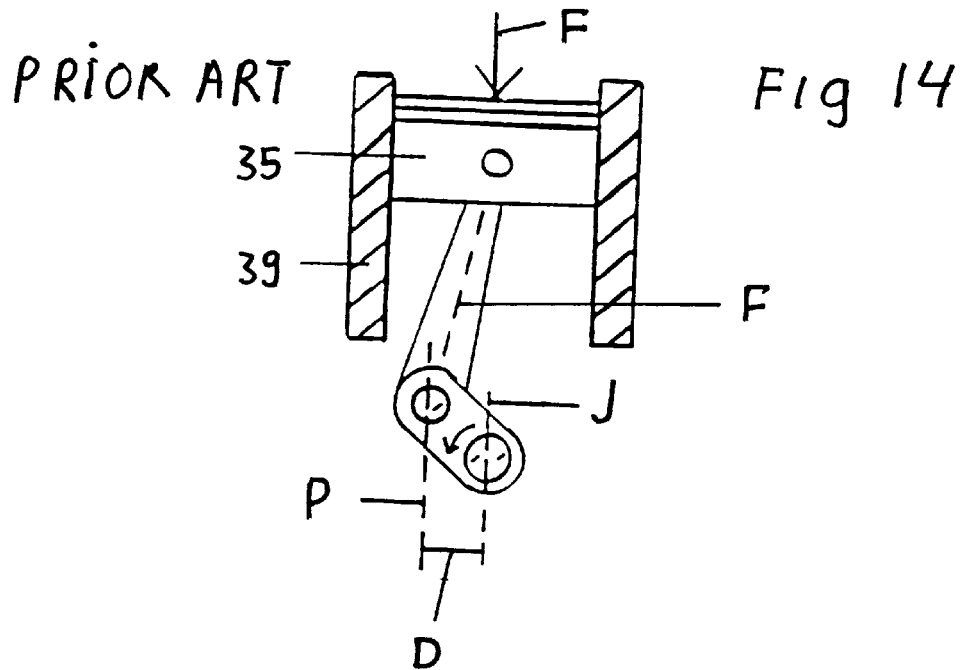
PRIOR ART  Fig 14
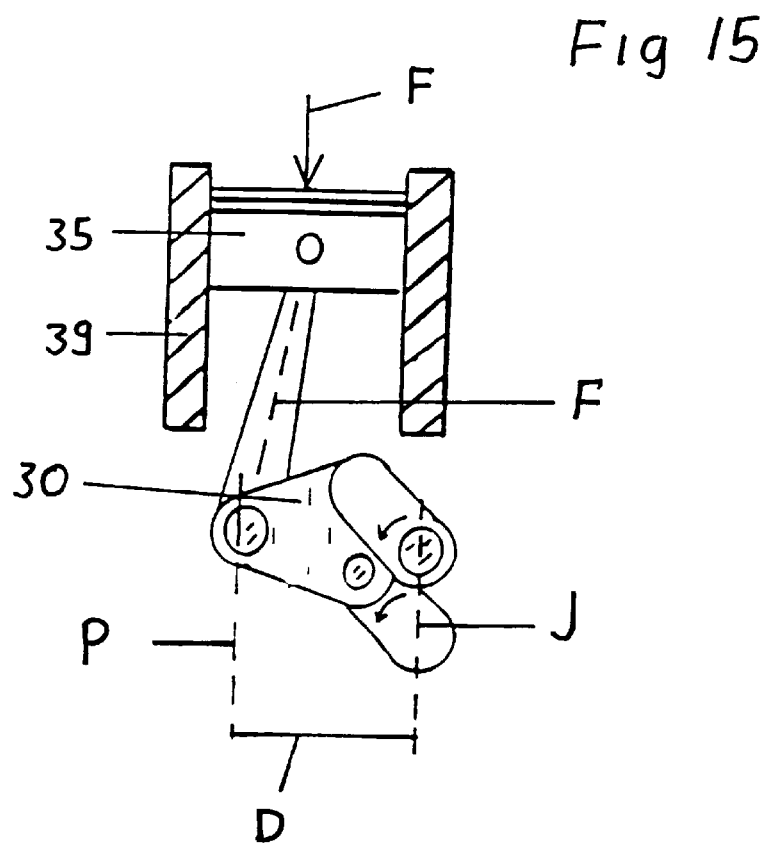
Fig 15

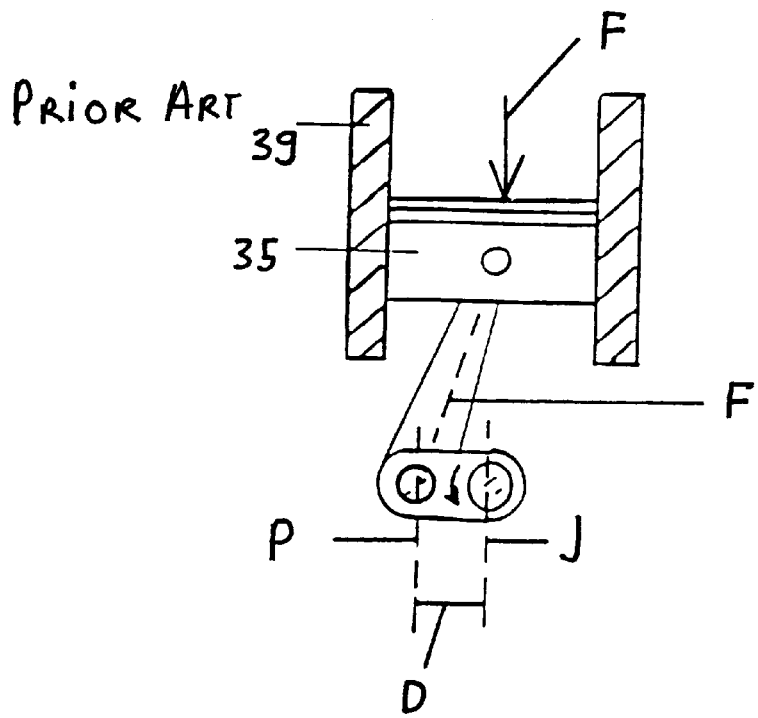
PRIOR ART  Fig 16
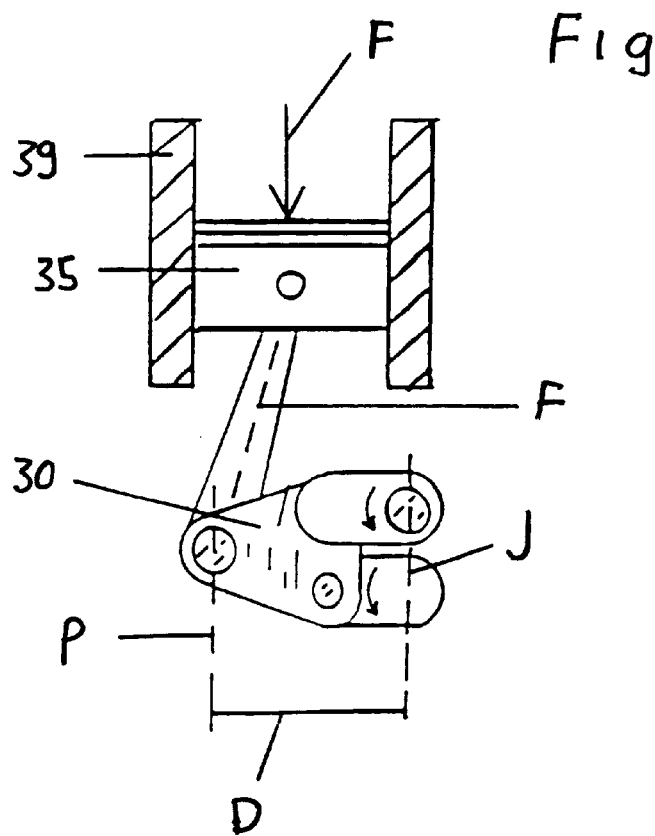
Fig 17

HIGH TORQUE MOTION CONVERTING AND TRANSMITTING MECHANISM FOR AN ENGINE

FIELD OF THE INVENTION

This invention relates to engines with motion converting and transmitting mechanism; and refers more particularly to improved methods and apparatus for conversion of and transmitting reciprocal motion into rotary motion and visa versa; and refers to piston engines, more particularly to internal combustion engines.

BACKGROUND OF THE INVENTION

The power delivered from an internal combustion engine is directly proportional to the torque applied to the output shaft and the rotary speed. Gasoline, gas or diesel engines designed for two or four cycle operation use a crankshaft and connecting rod in a mechanical system to change the reciprocating motion of the piston to rotary motion of the output shaft. The throw of the crank requires the connecting rod to assume various angles to the direction of moment of the piston.

Angular relation between the lobe of the crank and the piston the transmission of torque is not always efficient and significant losses occur. At top dead center no torque can be transmitteted through the crank and hence a decreased in loss, occurs as the engine goes through the power stroke. The useful work obtained is a function of an ever-changing amount of pressure within the engine combustion chamber multiplied by the infinitely small distance the piston rod and crank have moved at each pressure. This is according to the principle of resultant forces which is at work in the process. During the power stroke of a typical engine, peak pressure within the cylinder are not experienced when the effective moment are between the piston and the crank is at a maximum. This reduces the efficiency and power output of the engine and is the result of the kinematics inherent in the piston-rod-and-crank structure. Various attempts have been made to eliminate one or more of the above discussed, Examples of such proposals follow.

| Patent No. | Patent Date | Patentee |
| --- | --- | --- |
| 2,380,778 | 07/31/45 | J. M. Murdock |
| 2,390,558 | 12/11/45 | E. H. Schoen |
| 2,392,921 | 01/15/46 | C. A. Holman |
| 2,407,859 | 09/17/46 | R. S. Wilson |
| 2,477,376 | 07/26/49 | E. Jacobsen |
| 3,021,825 | 02/20/62 | Carcia |
| 4,211,190 | 07/08/80 | Indech |
| 4,301,776 | 11/24/81 | Fleming |
| 4,363,299 | 12/04/82 | Bristol |
| 4,395,977 | 08/02/83 | Pahis | is believed that the engines disclosed in this references do not satisfactorily resolve all the difficulties outlined above and particular do not effectively elimates no torque top dead center and produce greater torque during power stroke.

SUMMERY OF THE INVENTION

The invention is addressed to an improved motion conversion arrangement to produce substantially greater torque during the power stroke in an internal combustion engine, as compared with a convectional crank apparatus. The mechanism further eliminates losses in no-torque top dead center and provides greater advantage of the pressure curve developed in a internal combustion engine during the power stroke. Another object of the present mechanism is to provide a very simple and inexpensive yet reliable and effective arrangement for greater torque and for less mechanical stress in an internal combustion engine.

All of the foregoing and still further objects and advantages of the mechanism will become apparent from a study of the following specification taken in connection with the accompanying drawing where in like characters of refance designate corresponding parts throughout the several views and therein.

BRIEF DESCRIPTION OF THE INVENTION

FIG. 1 is an oblique view of the present mechanism.

FIG. 2 is an exploded oblique view of the present mechanism.

FIGS. 4, 5, 6, 7, 8, 9, 10, and 11 are front and side elevations of the present mechanism through 360 degrees of moment-one turn.

FIGS. 12, 13, 14, 15, 16, and are a comparison of the mechanical geometers of the present mechanism and to the conventional mechanizim (Prior Art).

Figure 18:
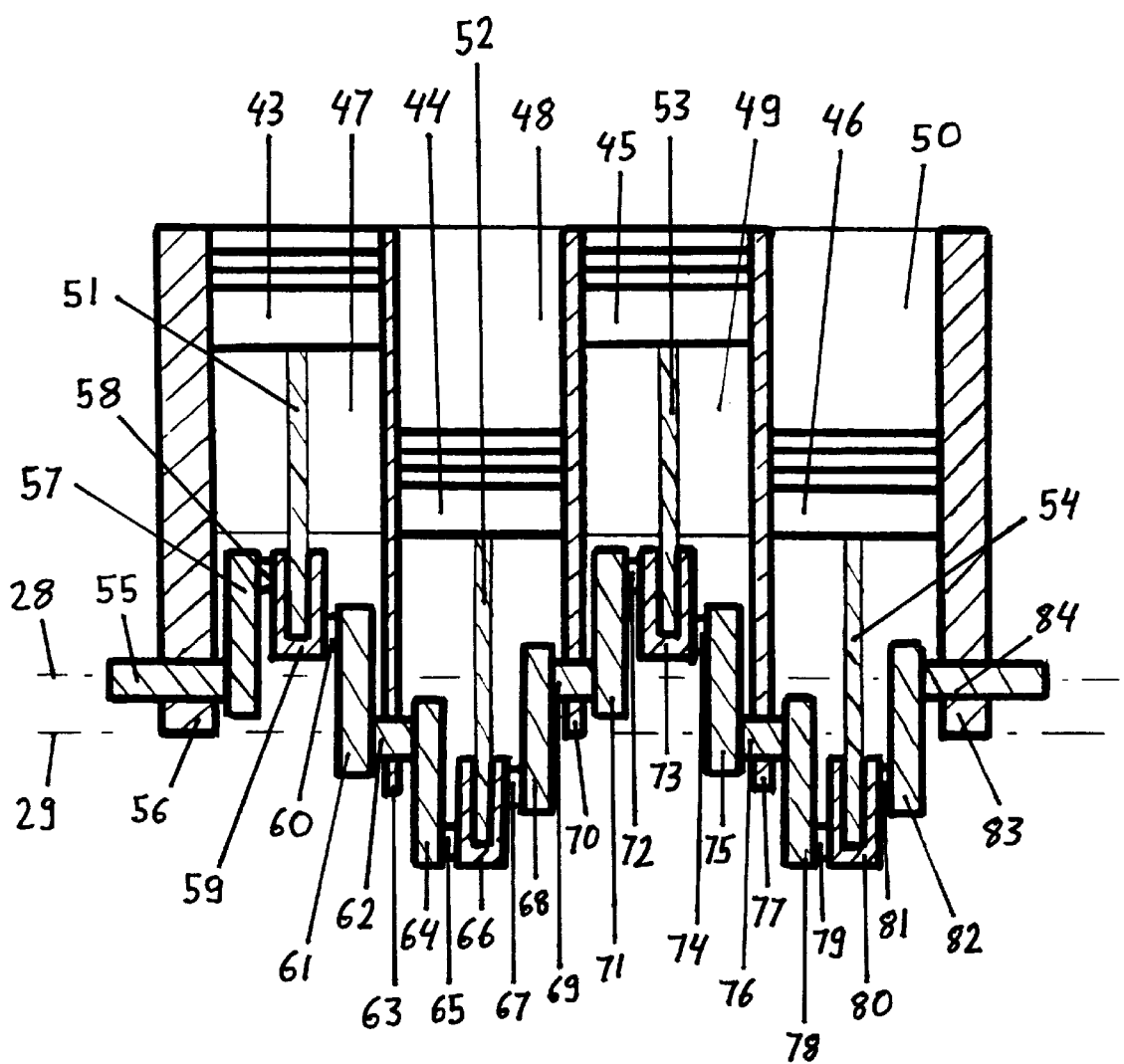

FIG. 18 is a side elevation of the present mechanism in four cylinder, in-line configuration.

Figure 19:
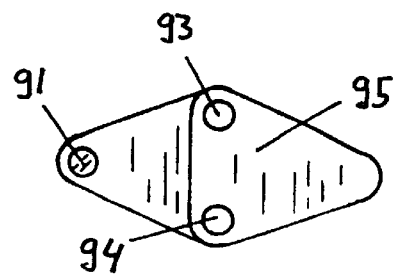

FIG. 19 is a front elevation of the torque member an opposed cylinder configuration.

Figure 20:
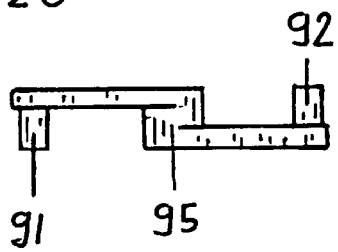

FIG. 20 is a top elevation of the torque member an opposed cylinder configuration.

Figure 21:
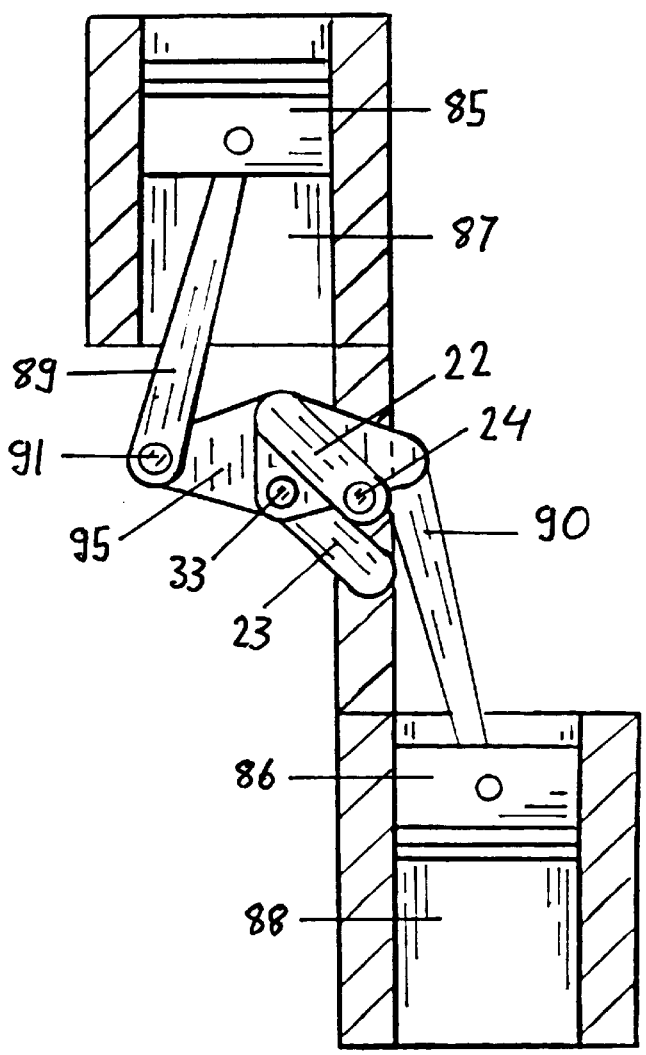

FIG. 21 is a front elevation of the present mechanism in two cylinder, opposed cylinder configuration.

REFERENCE NUMERALS IN DRAWINGS

Torque Members: 30, 59, 66, 73, 80, 95.
Cylinders: 39, 47, 48, 49, 50, 87, 88.
Pistons: 35, 43, 44, 45, 46, 85, 86.
Piston Arms: 36, 51, 52, 53, 54, 89, 90.
Crank Arms: 22, 23, 57, 61, 64, 68, 71, 75, 78, 82.
Pins: 33, 34, 38, 58, 60, 65, 67, 72, 74, 79, 81, 91, 92.
Holes: 26, 27, 31, 32, 37, 93, 94.
Journals: 24, 25, 55, 62, 69, 76, 84.
Bearings: 41, 42, 56, 63, 70, 77, 83.
Center Lines: 28, 29.
Travel Path: 40.

DETAILED DESCRIPTION OF THE DRAWINGS

In FIG. 1 we see the motion conversion apparatus of the present mechanism, which corresponds to and replaces a convention crank arrangement.

The apparatus comprises a pair of crank arms 22 and 23, rotatable pinned at two different points to torque member 30 which serves as a mean for receiving reciprocal motion and which is alternate by holes 26 and 27. Crank arms 22 rigidly connected to journal 24 and rotates around an axis of rotation 28. Crank arm 23 rigidly connected to journal 25 and rotates around an axis of rotation 29.

The second axis 29 is parallel to the first axis 28 but spaced apart therefrom.

FIG. 2 is an explored view of the device shown in FIG. I shows holes 26, 27, 31, 32 on the torque member 30. Pin 34 is located at the opposite surface and opposite end on the crank arm 22 of journal 24. Pin 33 is locate at the opposite surface and opposite end on the crank arm 23 of journal 25. Pin 34 pivotally connects crank arm 22 to torque member 30 by hole 32. Pin 33 pivotally connects crank arm 23 to opposite surface of torque member 30 by hole 31.

Figure 3:
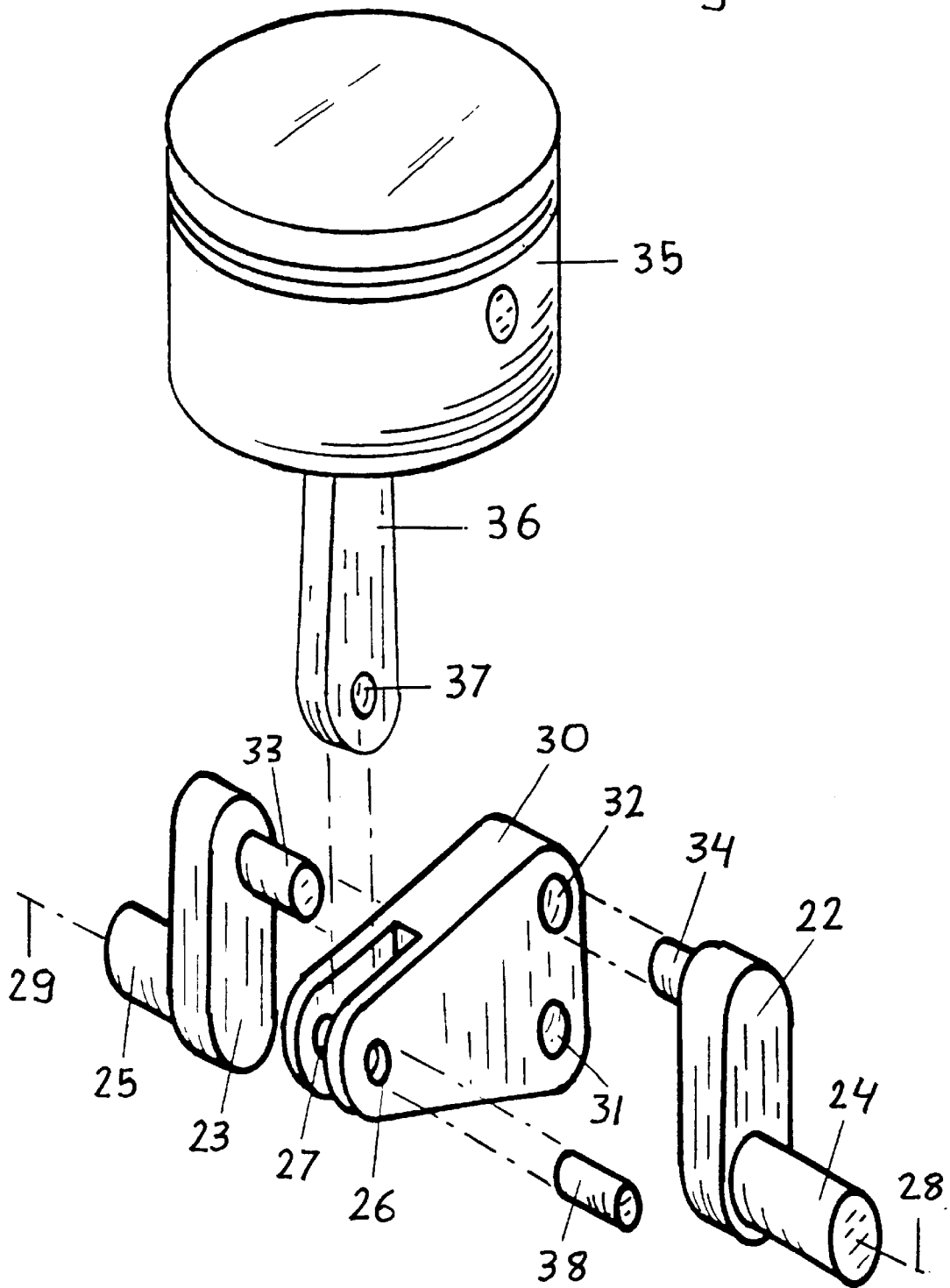
FIG. 3 is an exploded oblique view of the present mechanism with piston and piston rod.

FIG. 3 shows present mechanism in FIGS. 1, 2 with piston 35 and piston rod 36. Piston 35 pivotally connected to piston rod 36. Pin 38 is driven holes 26, 37 and 27 which form a pivotal pin between torque member 30 and piston rod 36. Torque member 30 serves as a means for receiving the reciprocal motion of the piston 35. Pins 33 and 34 pivotally connects torque member 30 to the crank arms 22, 23 and journals 24, 25 which is rotates around axis of the rotation 28 and 29.

The second hole 31 is parallel to the first hole 32 but spaced apart therefrom.

FIG. 4–11 illustrate the geometry of the first embodiment through an entire 360 degrees revolution. FIGS. 4, 6, 8 and 10 a front views and FIGS. 5, 7, 9 and 11 a side views of the mechanism in an engine.

Piston rod 36 which pivotal pinned between torque member 30 and piston 35 in cylinder 39. Pins 33 and 34 pivotally pinned between torque member 30 and crank arms 22 and 23. Crank arms 22 and 23 rigidly connected to journals 24 and 25 and rotates in bearings 41 and 42 and around axis 28 and 29.

Figure 4:
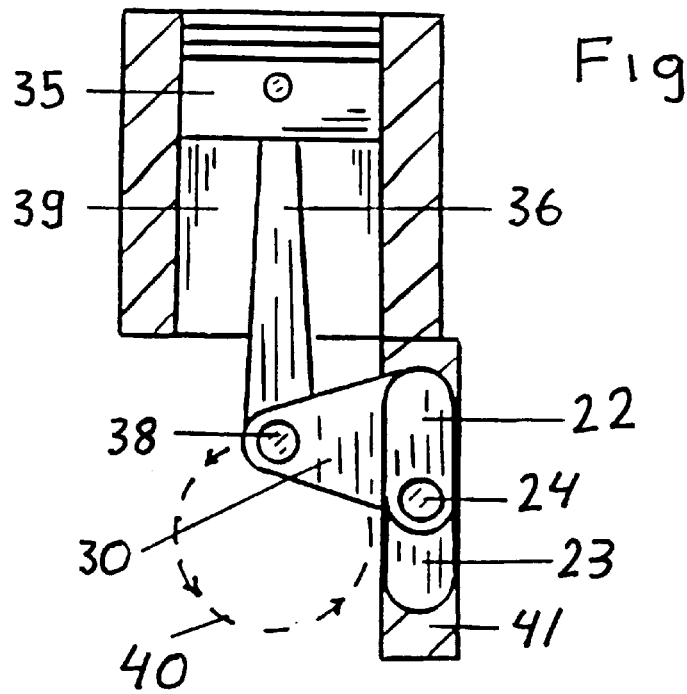

FIG. 4, 5 shows piston 35 at top of the cylinder 39 and 0° (360°) revolution to the start power stroke. Also, it can be shown by the geometry analysis of FIG. 13 that center of piston 35 does not place that over journals 24 and 25 (journal 25 not shown in FIG. 4) therefore no losses occurs in no-torque top dead center position result and engine experienced the peak ressures within the cylinder to start power stroke.

Figure 5:
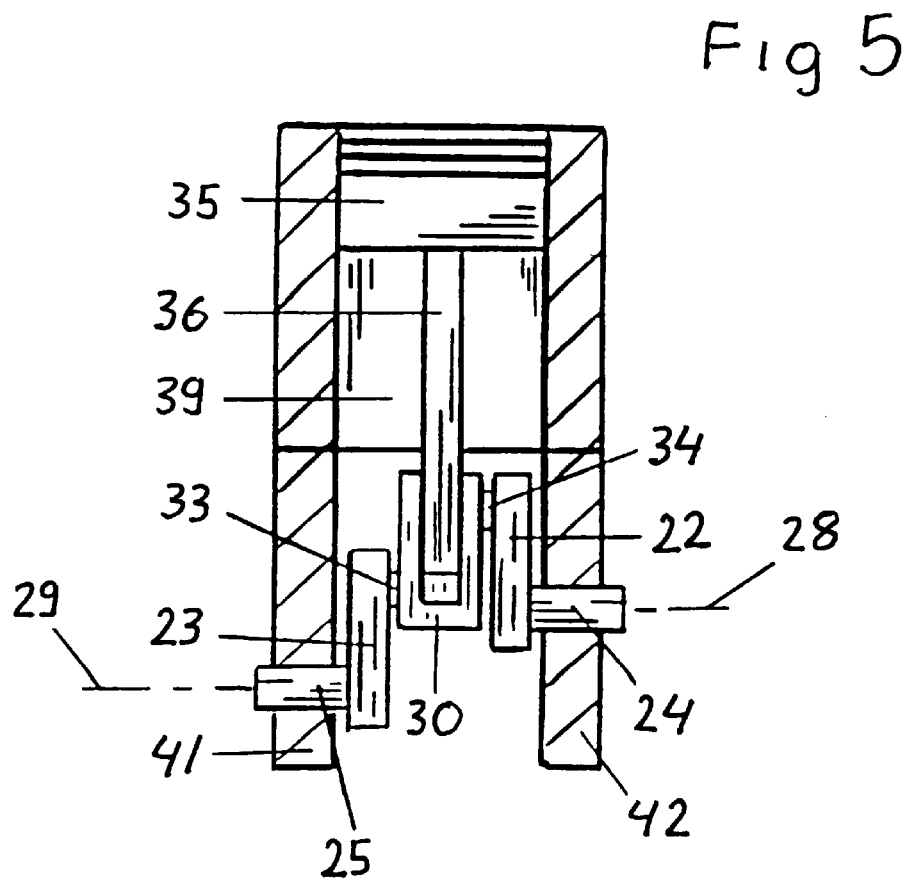
Figure 6:
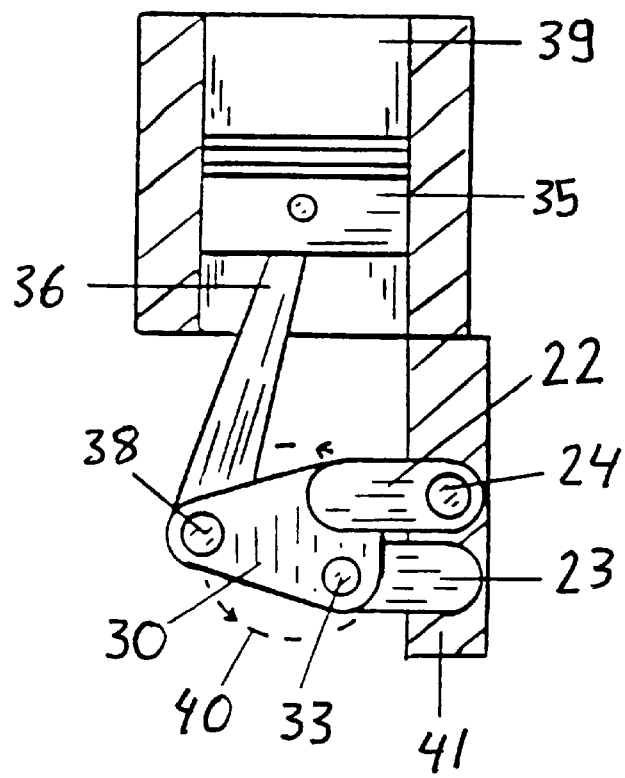
Figure 7:
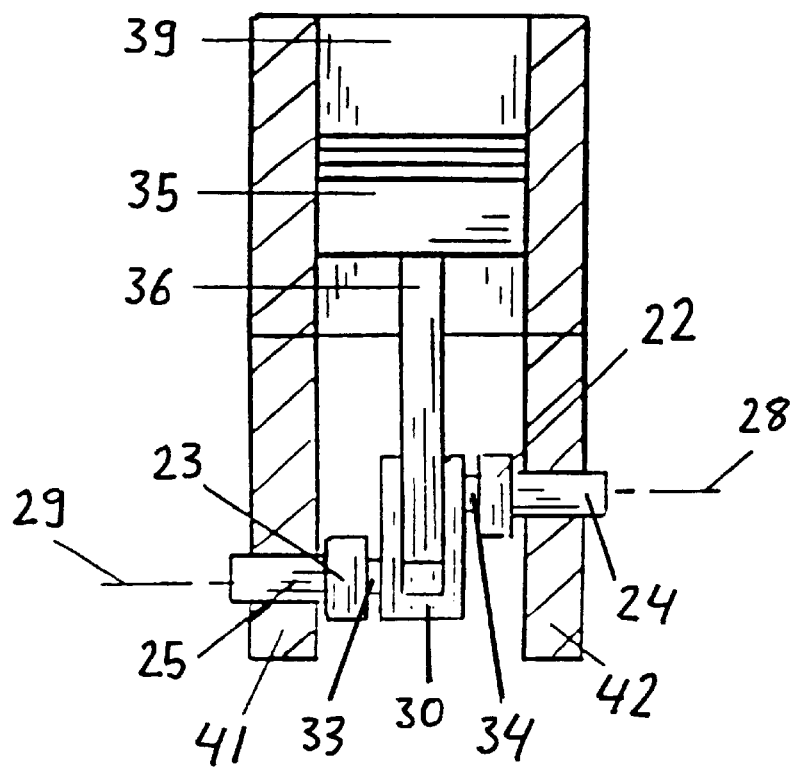

FIGS. 6, 7 shows invention mechanism 90° rotation from at first position in FIGS. 4 and 5. Torque member 30 continues to travel in path 40 at one-quarter of its full travel path 40 in FIG. 4.

Figure 8:
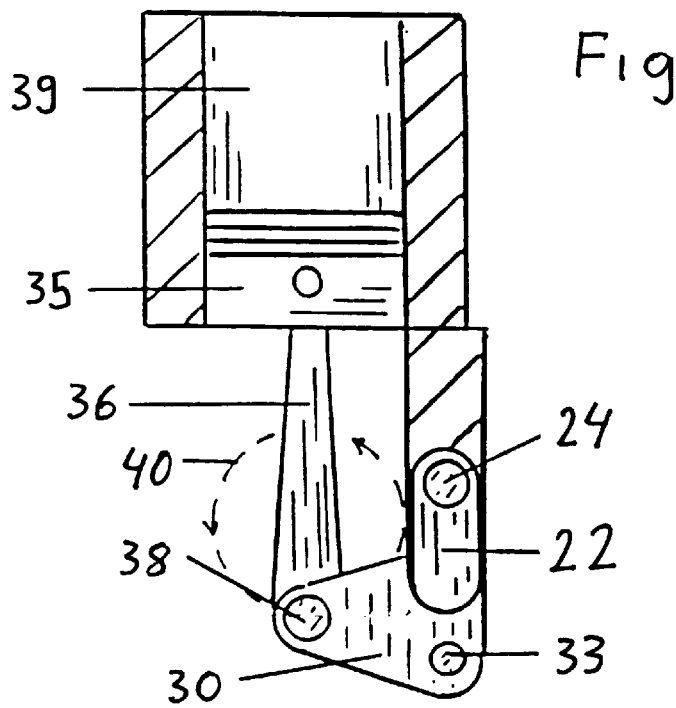
Figure 9:
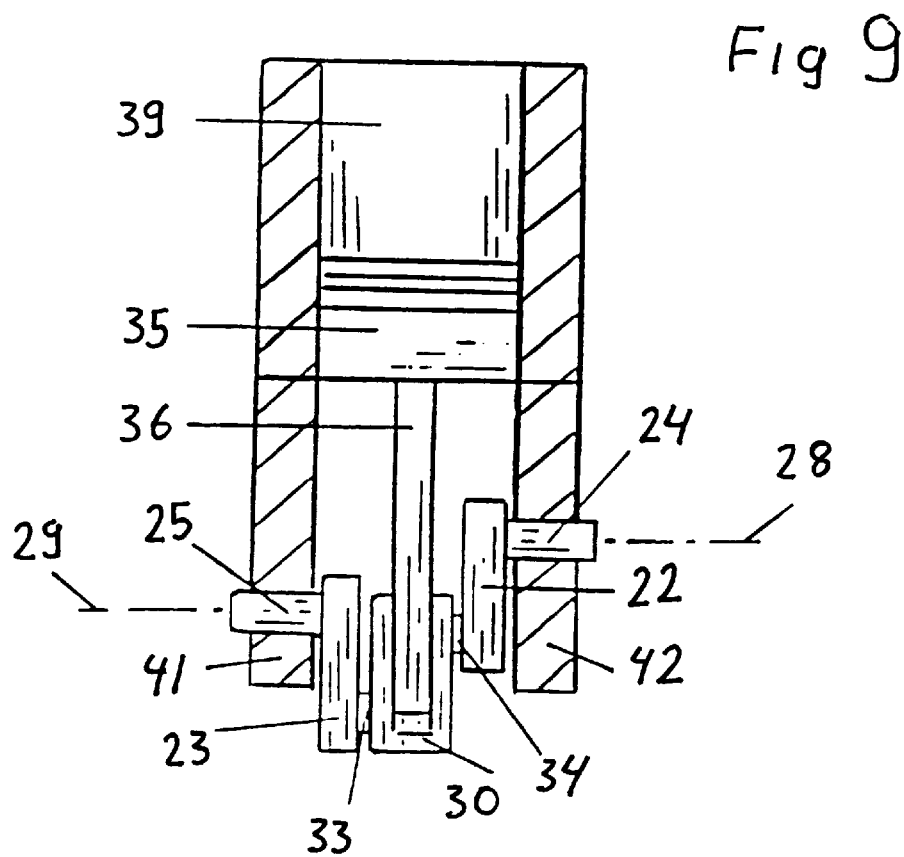

FIGS. 8 and 9 shows mechanism at 180° revolution at first position in FIGS. 4 and 5. Piston 35 is bottom of the cylinder 39 and torque member 30 continues to travel in bath 40 at one-half of its full travel path 40 in FIG. 4.

Figure 10:
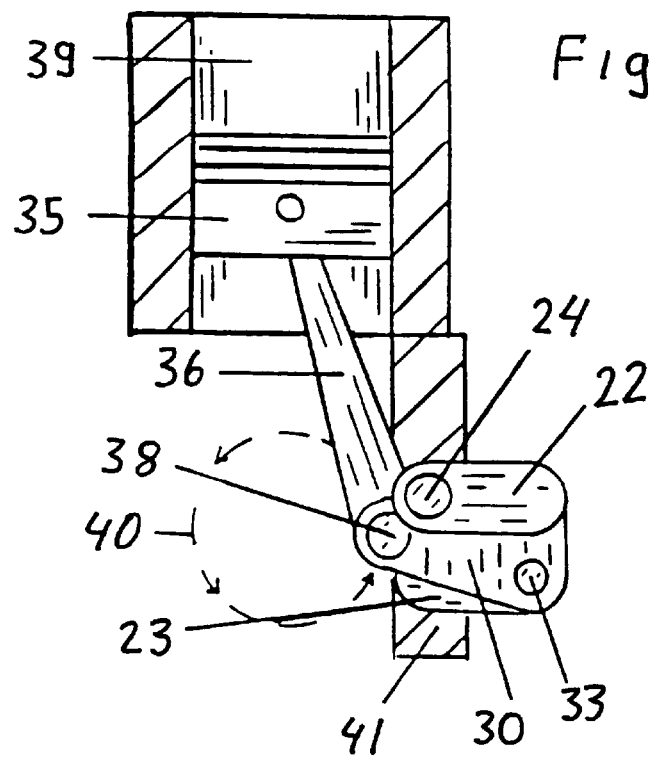
Figure 11:
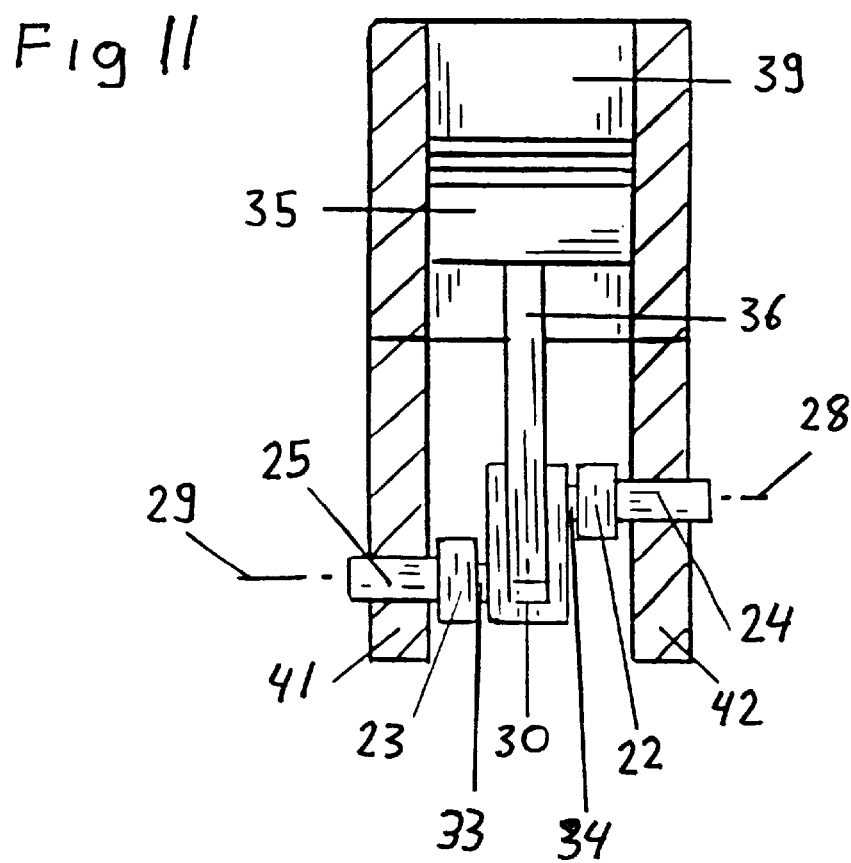

FIGS. 10 and 11 illustrate mechanism at 270° revelation at first position in FIGS. 4 and 5. Torque member continues to travel in path 40 at three-quarter of its full travel path 40 in FIG. 4.

Figure 12:
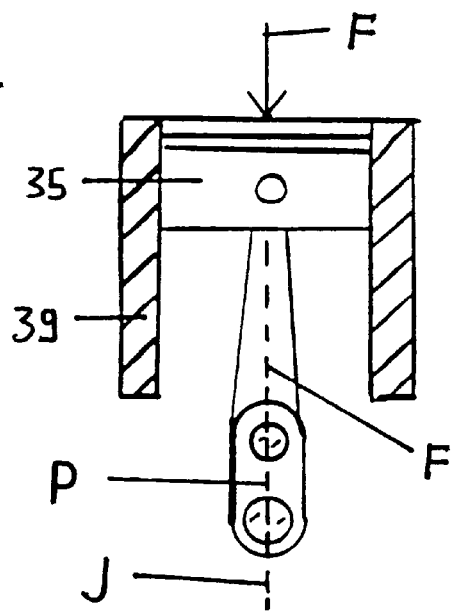
Figure 13:
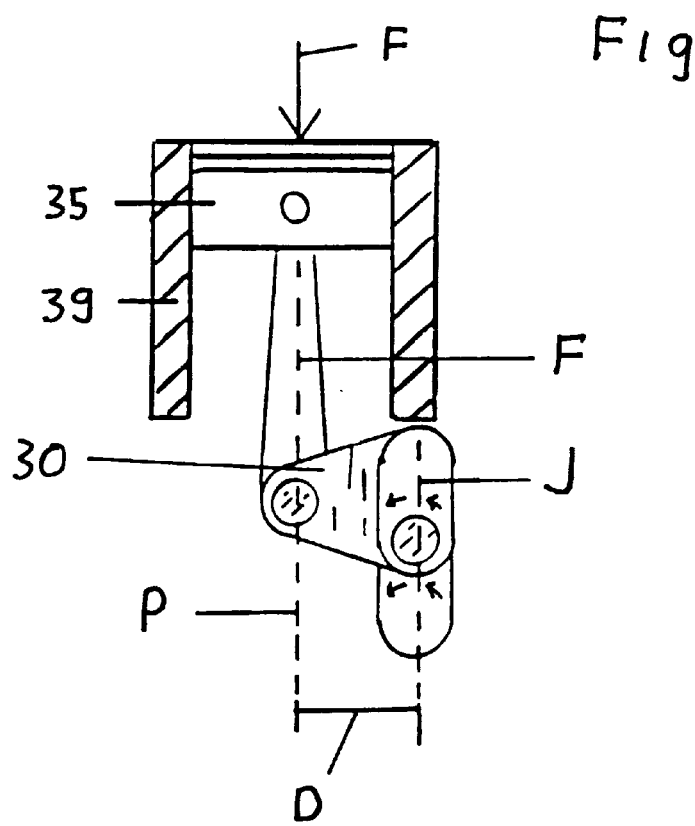

FIGS. 12–17 is comparison a mechanical geometry analysis of the present invention to conventional crank apparatus (Prior Art). FIGS. 12, 14 and 16 shows conventional crank geometry and FIGS. 13, 15 and 17 shows mechanism geometry.

F. is force of pressures within the cylinder and line between center of piston pin and center of crank arm pin.

P. is center line of pins parallel to the piston stroke.

J. is center line of journals parallel to the piston stroke.

D. is distance between P. and J.

T. is torque equaling force x distance T=F×D.

FIGS. 12 and 13 shows piston 35 is top of the cylinder 39. In FIG. 12. F is in line with J. and no distance between P and J. D. is zero. Torque equalling force x distance T=F×Zero therefore no torque top dead center and engine not experienced peak pressures within the cylinder as a power output, loss of power and high mechanical stresses occur in a conventional engine.

In contrast, at FIG. 13 the present mechanism provides large amount of distance between P. and J. and F. is not in line with J. Torque equaling force x distance. T=F× large D. therefore high torque top center and engine experienced peak pressures within the cylinder as a high power output and less mechanical stresses occur in a engine with present mechanism.

FIGS. 14 and 15 shows mechanism of engines rotates at 45° at the first position of in FIGS. 12 and 13. In FIG. 14. F. is not in line with J. and D. occur. T=F×D and engine in power stroke. In contrast present mechanism in FIG. 15 shows torque member 30 provides larger distance between P. and J. and T=F×D and high torque output in power stroke comparison to prior art in FIG. 14.

FIGS. 16 and 17 shows mechanism of engines rotates at 90° at the first position of in FIGS. 12 and 13. FIG. 17 torque member 30 provides larger D. between P. and J. contract to conventional crank mechanism geometry in FIG. 16.

As we seen a comparison analysis FIGS. 12–17 present mechanism provides high torque top center and improved torque output entire 180 degree at power stroke and less mechanical stresses comparison to same size conventional piston engine (Prior Art).

FIG. 18 is a side elevation sectioned, except through the piston mid-cylinder of a piston engine in accordance with a preferred embodiment of the present mechanism with two piston of a in line four cylinder engine shown in a top position.

Contection rods 51, 52, 53 and 54 are pivotally pinned to pistons 43, 44, 45 and 46 and to torque members 59, 66, 73 and 80. Torque member 59 pivotally pinned by pin 58 to crank arm 57. Crank arm 57 is rigidly connected to journal 55 and rotates around a first axis of rotation 28 in bearing 56.

Defining, for the purpose of this description. the direction of travel of the pistons 43, 44, 45 and 46 as vertical pin 60 spaced vertically below pin 58 and is located on the opposite surface of torque member 59. Pin 60 pivotally connect torque member 59 to crank arm 61. Crank arm 61 is rigidly connected to journal 62 and rotates around a second axis of rotation 29 and spaced vertically below the first axis 28. In the other cylinders in bearing 63 journal 62 rigidly connected to crank arms 61 and 64. In bearing 70 journal 69 rigidly connected to crank arms 68 and 71. In bearing 77 journal 76 rigidly connected to crank arms 75 and 78. In bearing 83 journal 84 rigidly connected to crank arm 82. Journals 55 and 69 are co-linear on axis 28 and with journal 84. Journal 62 is co-linear with on axis 29 and with journal 76.

Similarly pins 58 and 72 are co-linear with each other and their axial line follows the same cylindrical path around axis 28 as pins 67 and 81. Pins 60 and 74 are co-linear with each other and their axial line follows the same cylindrical path around axis 29 as pins 65 and 79.

FIG. 19 is a front elevation of the opposed cylinder torque member 95 shows pins 91 and 92 (not shown). And holes 93 and 94.

FIG. 20 is a top elevation of the opposed cylinder torque member 95 shows pins 91 and 92. Holes 93 and 94 (not shown).

FIG. 21 is a front elevation sectioned mid-cylinder, except through the pistons of an opposed cylinder configuration engine, in accordance with a preferred embodiment of the present mechanism, comprises a pair of opposed pistons 85 and 86 in opposed cylinders 87 and 88. Piston rod 89 pivotally connected by pin 91 to torque member 95 Piston rod 90 pivotally connected by pin 92 (see FIG. 20) opposite end to torque member 95. Which drives crank arms 22 and 23 (see FIGS. 2–11).

Crank arm 22 pivotally pinned via pin 34 (see FIGS. 2–11) entering pivot 93 (see FIG. 19) on torque member 95.

Crank arm 23 pivotally pinned via pin 33 entering pivot 94 (see FIG. 19) opposite surface on torque member 95.

It will be appreciated that it does not particularly matter shape and size of torque member and which member has fixed pin and which member pivots on the pin, so long as a pivotally pinned situation exists where it is specified in this specification.

It will also be appreciated that with the above principles any number of cylinders can be tied together in V. in-line, opposing or any less conventional configuration using any combination of pins and pivots which will provide the functions described above. Power take-off may be had: one of the two rotting shafts or either of two rotating shafts or either side of an engine comprising multiple cylinders or by other less conventional arrangement.

The mechanism can also be applied to muscle-powered reciprocating motion, for example pedals can be substituted for piston rods to provide propulsion for a human-powered vehicle.

Having thus described my mechanism I claim:

1. A motion converting and transmitting mechanism comprising:

means for receiving reciprocal motion;

said receiving means is rotatively pinned by a first pin means to a first crank arm;

said receiving means is rotatively pinned by a second pin means to a second crank arm;

the first pin spaced from said second pin;

the first said crank arm rotating about a first crank axis;

the second crank arm rotating about a second crank axis;

the first crank axis spaced from the second crank axis;

said means for receving reciprocal motion comprises a torque member.

2. Apparatus according to claim 1, in which a pin connects a reciprocating member to said torque member and is spaced from said first and second pin means on said torque member.

3. Apparatus according to claim 1, in which at least one crank axis comprises a journal means for transmitting rotary motion to a power point.

4. Apparatus according to claim 1, in which the mechanism is driven by one of the crank axes, and motion is converted from rotary to reciprocating.

5. Apparatus according to claim 1, in which the mechanism is driven by said torque member, and motion is converted from reciprocating to rotary.

\* \* \* \* \*